United States Patent
Filsfils et al.

(10) Patent No.: US 9,485,150 B2
(45) Date of Patent: Nov. 1, 2016

(54) FAST REROUTE FOR SEGMENT ROUTING TRAFFIC

(71) Applicant: Cisco Technology, Inc., San Jose, CA (US)

(72) Inventors: Clarence Filsfils, Brussels (BE); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 14/212,284

(22) Filed: Mar. 14, 2014

(65) Prior Publication Data

US 2014/0269727 A1 Sep. 18, 2014

Related U.S. Application Data

(60) Provisional application No. 61/791,242, filed on Mar. 15, 2013.

(51) Int. Cl.

| | |
|---|---|
| *H04L 12/715* | (2013.01) |
| *H04L 12/741* | (2013.01) |
| *H04L 12/24* | (2006.01) |
| *H04L 12/721* | (2013.01) |
| *H04L 12/723* | (2013.01) |

(52) U.S. Cl.
CPC ............... *H04L 41/12* (2013.01); *H04L 45/04* (2013.01); *H04L 45/12* (2013.01); *H04L 45/46* (2013.01); *H04L 45/50* (2013.01); *H04L 45/507* (2013.01); *H04L 45/74* (2013.01); *H04L 45/745* (2013.01); *H04L 45/54* (2013.01)

(58) Field of Classification Search
CPC ..... H04L 41/12; H04L 45/04; H04L 45/507; H04L 45/12; H04L 45/50; H04L 45/745; H04L 45/54
See application file for complete search history.

(56) References Cited

U.S. PATENT DOCUMENTS

| | | | |
|---|---|---|---|
| 6,032,197 A | 2/2000 | Birdwell | 709/216 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Smith | 398/51 |
| 7,061,921 B1 | 6/2006 | Sheth | 370/395.52 |
| 7,068,654 B1 | 6/2006 | Joseph et al. | 370/392 |

(Continued)

OTHER PUBLICATIONS

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

(Continued)

*Primary Examiner* — Ayaz Sheikh
*Assistant Examiner* — Debebe Asefa
(74) *Attorney, Agent, or Firm* — Campbell Stephenson LLP

(57) ABSTRACT

An apparatus and method are disclosed for fast reroute (FRR) for native segment routing (SR) traffic. In one embodiment, a node receives a packet that includes a segment routing (SR) segment identifier (ID) stack. The node determines what type of segment is designated as the active segment in the segment ID stack. Based, at least in part on the type of active segment, the node selects an update routine out of several possible update routines and performs the selected update routine. The update routine modifies the segment ID stack.

20 Claims, 13 Drawing Sheets

(56) References Cited

U.S. PATENT DOCUMENTS

| | | | |
|---|---|---|---|
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 * | 8/2010 | Huang et al. | 370/474 |
| 7,817,667 B2 * | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 * | 9/2013 | Wang et al. | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 * | 5/2015 | Dibirdi et al. | 370/235 |
| 9,112,734 B2 * | 8/2015 | Edwards et al. | |
| 9,118,572 B2 | 8/2015 | Sajassi | |
| 2001/0037401 A1 | 11/2001 | Soumiya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl, Jr. et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Sierecki | 370/351 |
| 2007/0058638 A1 | 3/2007 | Guichard et al. | 370/395.31 |
| 2007/0189291 A1 | 8/2007 | Tian | 370/390 |
| 2008/0002699 A1 | 1/2008 | Rajsic | 370/392 |
| 2008/0037117 A1 | 3/2008 | Tanaka | 370/471 |
| 2008/0075016 A1 | 3/2008 | Ashwood-Smith | 370/252 |
| 2008/0084881 A1 | 4/2008 | Dharwadkar et al. | 370/392 |
| 2008/0101227 A1 | 5/2008 | Fujita et al. | 370/231 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0135815 A1 | 5/2009 | Pacella | 370/389 |
| 2010/0063983 A1 | 3/2010 | Groarke et al. | 707/803 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269725 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pc-estatement-pce-mpls-te-00; Network Working Group, Internet-Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)—Based Architecture, Network Working Group, Request for Comments 4655, Aug. 2006, pp. 1-80.

Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.

(56) References Cited

OTHER PUBLICATIONS

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Cisco Systems, Inc., "Introduction to Intermediate System-to-Intermediate System Protocol," published 1992-2002; pp. 1-25.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Eckert, Toerless et al., "Failure Protection for Traffic Engineered Bit Indexed Explicit Replication", U.S. Appl. No. 15/054,480, filed Feb. 26, 2016; consisting of Specification, Claims, Abstract, and Drawings (76 pages).
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).
Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Filsfils, C. et al., Cisco Systems, Inc., "Segment Routing Interoperability with LDP", draft-filsfils-spring-segment-routing-ldp-interop-01.txt; Apr. 18, 2014, pp. 1-16.

\* cited by examiner (Adjacency, Nodal)

(Adjacency, Nodal—Refinement 1)

(Adjacency, Adjacency)

(Nodal)

(Nodal—Refinement 2)

FAST REROUTE FOR SEGMENT ROUTING TRAFFIC

RELATED APPLICATIONS

This application claims the domestic benefit under Title 35 of the United States Code §119(e) of U.S. Provisional Patent Application Ser. No. 61/791,242, entitled "Segment Routing," filed Mar. 15, 2013, which is hereby incorporated by reference in its entirety and for all purposes as if completely and fully set forth herein.

BACKGROUND OF THE INVENTION

Network nodes are capable of receiving and forwarding packets. Network nodes may take form in one or more routers, one or more bridges, one or more switches, one or more servers, or any other suitable communications processing device. A packet is a formatted unit of data that typically contains control information and payload data. Control information may include, for example: source and destination IP addresses, error detection codes like checksums, sequencing information, and the like. Control information is typically found in packet headers and trailers, and payload data is typically found in between the headers and trailers.

Packet forwarding involves decision processes that, while simple in concept, can be complex. Since packet forwarding decisions are handled by nodes, the total time required to perform packet forwarding decision processes can become a major limiting factor in overall network performance.

One complexity that can arise regarding packet forwarding is determining how to handle changing network conditions. For example, if a given node decides to forward a packet across a given link to another node, but subsequently detects that the link has unexpectedly become unavailable, the given node is faced with the prospect of deciding on an alternate path for the packet. This is known as rerouting the packet.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
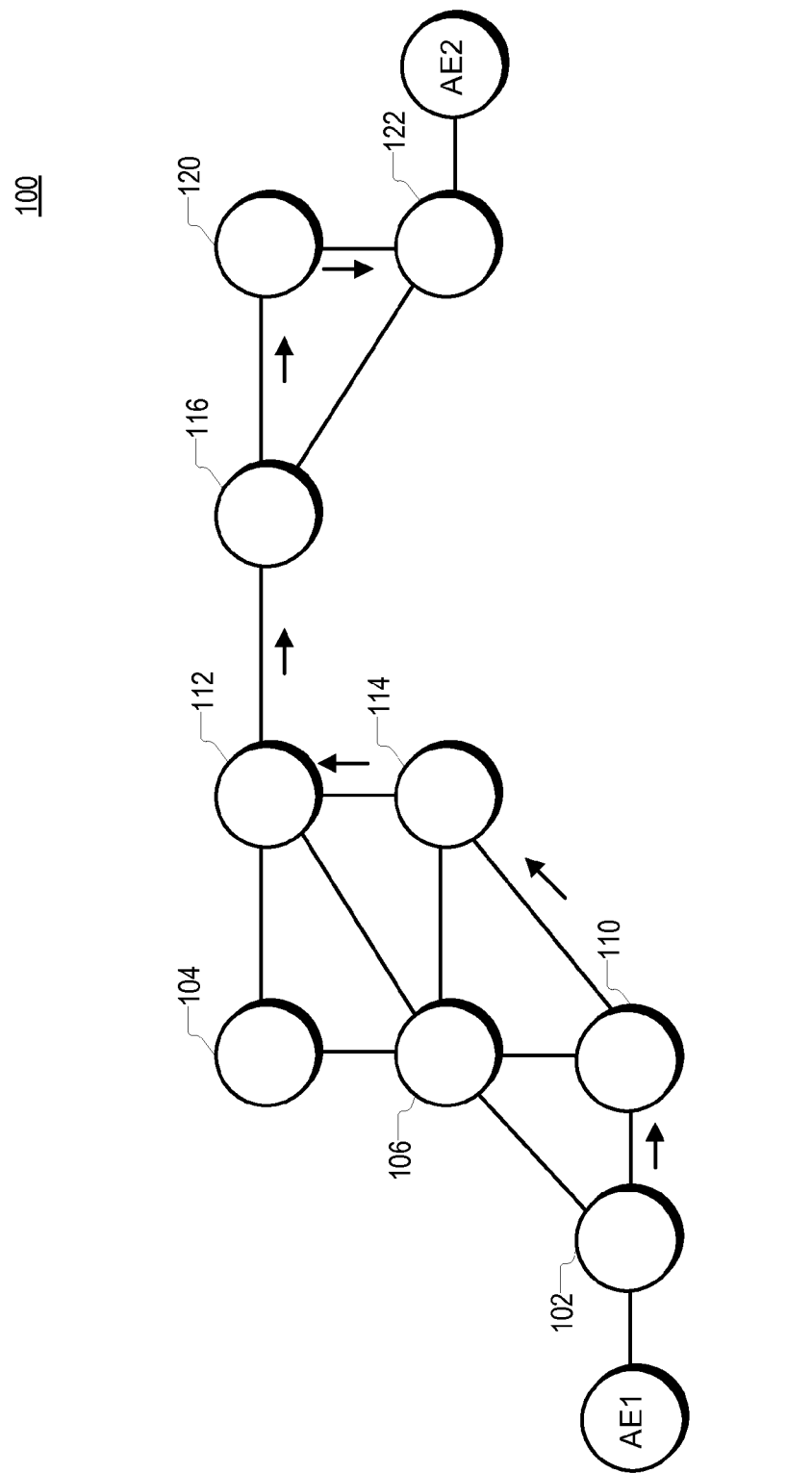
FIG. 1 is a block diagram illustrating an example network.

An apparatus and method are disclosed for fast reroute (FRR) for native segment routing (SR) traffic. In one embodiment, a node receives a packet that includes a segment routing (SR) segment identifier (ID) stack. The node determines what type of segment is designated as the active segment in the segment ID stack. Based, at least in part on the type of active segment, the node selects an update routine out of several possible update routines and performs the selected update routine. The update routine modifies the segment ID stack.

Packet Forwarding Mechanisms

Internet protocol (IP) routing and multi-protocol label switching (MPLS) are distinct packet forwarding mechanisms. IP routing uses IP addresses inside packet headers to make packet forwarding decisions. In contrast, MPLS implements packet forwarding decisions based on short path identifiers called labels, which are attached to packets. Segment routing (SR) is yet another packet forwarding mechanism. SR is similar to MPLS in many regards. For example, packet forwarding decisions in SR can be based on short path identifiers called segment IDs attached to packets. However, substantial differences exist between SR and MPLS as will be more fully described below.

IP Routing

IP routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the destination address in the packet and lookup a corresponding egress interface for the next hop. The node then forwards the packet through the egress interface. The next hop that receives the packet performs its own forwarding table lookup using the same destination IP address, and so on.

MPLS and LDP

MPLS is commonly employed in provider networks. Packets enter an MPLS network via an ingress edge node, travel hop-by-hop along a label-switched path (LSP) that typically includes one or more core nodes, and exit via an egress edge node.

Packets are forwarded along an LSP based on labels and LDP forwarding tables. Labels allow for the use of very fast and simple forwarding engines in the data plane of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is employed in the control planes of nodes. Two nodes, called LDP peers, can bi-directionally exchange labels on a FEC-by-FEC basis. LDP can be used in a process of building and maintaining LDP forwarding tables that map labels and next hop egress interfaces. These forwarding tables can be used to forward packets through MPLS networks as more fully described below.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop via, the ingress node attaches the label.

When a node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may pop or remove the incoming label before forwarding the packet to an egress edge node in the network, which in turn may forward the packet towards its destination using the packet's destination address and an IP forwarding table. To illustrate MPLS aspects, FIG. 1 shows a portion of an example MPLS network 100 that includes nodes 102-122 coupled together via communication links. An LSP from node 102 to node 122 can be created so that all packets of a stream associated with a particular FEC sent from node 102 to node 122 will travel through the same set of nodes. Each node maintains information for the LSP established through it in an LDP forwarding table. Thus, if node 110 knows that node 114 is the next hop along the LSP for all packets received from node 102 that are destined for node 122, node 110 can forward the packets to node 114.

Segment Routing

Segment routing (SR) is a mechanism in which nodes forward packets using SR forwarding tables and segment IDs Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane.

Packets can enter an SR enabled network (i.e., a network of nodes that are SR enabled) via an ingress edge node, travel hop-by-hop along a segment path (SP) that includes one or more core nodes, and exit the network via an egress edge node.

Like labels, segment IDs are short (relative to the length of an IP address or a FEC), fixed-length identifiers. Segment IDs may correspond to topological segments of a network, services provided by network nodes, etc. Topological segments represent one-hop or multi-hop paths to SR nodes. Topological segments act as sub-paths that can be combined to form an SP. Stacks of segment IDs can represent SPs, and SPs can be associated with FECs as will be more fully described below.

There are several types of segment IDs including nodal segment IDs, adjacency segment IDs, area segment IDs, service segment IDs, etc. Nodal segment IDs are typically assigned to nodes such that no two SR nodes belonging to a network domain are assigned the same nodal segment ID. Nodal segment IDs can be mapped to unique SR node identifiers such as node loopback IP addresses (hereinafter node loopbacks). In one embodiment, all assigned nodal segment IDs are selected from a predefined ID range (e.g., [32, 5000]). A nodal segment ID corresponds to a one-hop or a multi-hop, shortest path (SPT) to an SR node assigned the nodal segment ID, as will be more fully described below.

An adjacency segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency segment IDs; adjacency segment IDs may not be unique within a network. This disclosure will presume that only one link exists between nodes in a network, it being understood the present disclosure should not be limited thereto.

Each SR node can assign a distinct adjacency segment ID for each of the node's links. Adjacency segment IDs are locally significant; separate SR nodes may assign the same adjacency segment ID, but that adjacency segment ID represents distinct links. In one embodiment, adjacency segment IDs are selected from a predefined range that is outside the predefined range for nodal segment IDs.

SR nodes can advertise routing information including nodal segment IDs bound to loopbacks, adjacency segment IDs mapped to link IDs, etc., using protocols such as IGP and/or BGP with SR extension. Nodes can use the routing information they receive to create or update SR forwarding tables. To illustrate, SR nodes may use the routing information they receive and protocols such as open shortest path first (OSPF) with SR extension in order to create topology maps of the network, which in turn can be used to identify next hop egress interfaces of shortest paths (SPTs) to respective node loopbacks. The identified SPT or next hop egress interfaces are then mapped to respective nodal segment IDs in an SR forwarding table. Nodes can also map their adjacency segment IDs to egress interfaces for respective links in SR forwarding tables. Because adjacency segment IDs are locally significant, however, adjacency segment IDs should only be mapped in SR forwarding tables of the nodes that advertise the adjacency segment IDs. In other words, an SR node that advertises an adjacency segment ID should be the only node in the network area that has an SR forwarding table that maps the adjacency segment ID to an egress interface.

As noted above, SR enables segment paths (SPs), which can be used for transporting packets through a network. SPs can be associated with FECs, and can be established for a variety of purposes. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective SPs. Individual segment IDs in a segment ID stack may correspond to respective segments or sub paths of a corresponding SP.

When an SR ingress edge node receives a packet, the node or a centralized control plane server in data communication with the node, can select an SP for the packet based on information contained in the packet. In one embodiment, a FEC may be calculated for the packet using the packet's destination address. The FEC is then used to select a segment ID stack mapped thereto. The ingress edge node can attach the selected segment ID stack to the packet via an SR header. The packet with the attached segment ID stack is forwarded along and can traverse the segments of the SP in an order that corresponds to the list order of the segment IDs in the segment ID stack. A forwarding engine operating in the data plane of each SR node can use the top segment ID within the segment ID stack to lookup the egress for the next hop. As the packet and attached segment ID stack are forwarded along the SP in a hop-by-hop fashion, segment IDs can be popped off the top of the segment ID stack. In another embodiment, the attached stack of segment IDs remains unchanged as the packet is forwarded along the SP. In this embodiment, a pointer to an active segment ID in the segment ID stack can be advanced as the packet is forwarded along the SP. In contrast to MPLS, however, segment IDs are typically not swapped as the packet and attached segment ID stack are forwarded along the SP.

Figure 2:
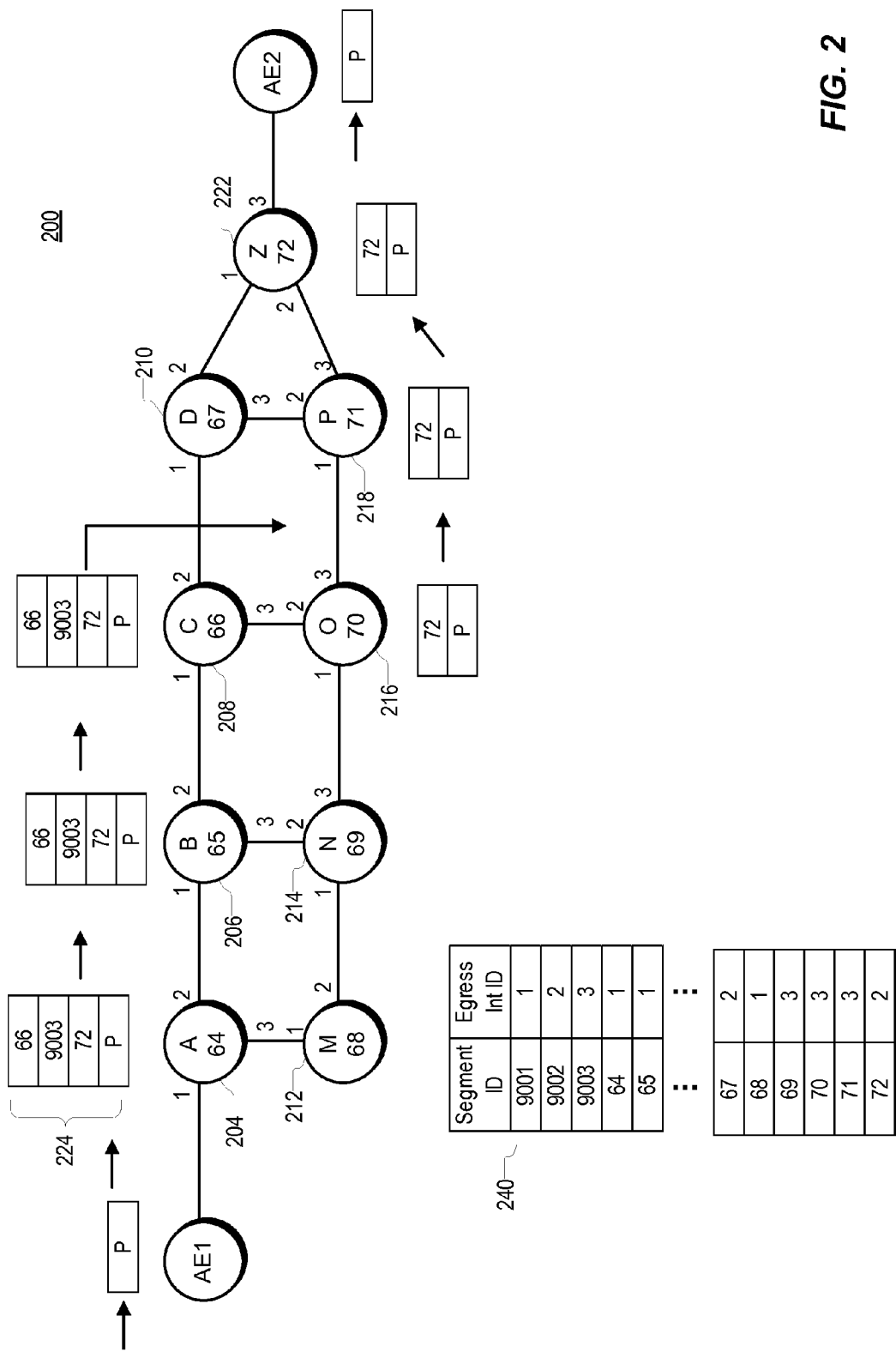
FIG. 2 is a block diagram illustrating an example network.

To illustrate general concepts of SR, FIG. 2 shows an example SR enabled provider network that is in data communication with access network nodes AE1 and AE2. Network 202 consists of SR nodes 204-222. Nodes 204-210 are assigned unique nodal segment IDs 64-67, respectively, nodes 212-218 are assigned unique nodal segment IDs 68-71, respectively, and node 222 is assigned unique nodal segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to identify SPTs and thus next hop egress interfaces for SR forwarding tables. Nodes 204-222 can also assign locally significant adjacency segment IDs. For example, node 208 can assign adjacency segment IDs 9001-9003 to links CB, CD, and CO, respectively.

Each of SR nodes 204-222 can advertise routing information to the other nodes in network 202 using IGP with SR extensions. For example, node 208 can generate and send one or more link state advertisements that include adjacency segment IDs 9001-9003 bound to link IDs CB, CD, and CO, respectively, and nodal segment ID 66 bound to loopback C. One of ordinary skill understands that link state advertisements may contain additional information. Using the advertisements they receive, the control planes of nodes 204-222 can generate respective SR forwarding tables for use in the data planes. For example, node 208 can generate example SR forwarding table 240 that maps adjacency segment IDs 9001-9003 to node interface IDs 1-3, respectively, and nodal segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency segment IDs 9001-9003 to interfaces; SR forwarding tables in the other nodes of network 202 should not map adjacency segment IDs 9001-9003.

In addition to creating SR forwarding tables based on received segment ID advertisements, SR nodes a centralized control plane server (not shown) can create segment ID stacks for respective SPs. For example, ingress edge node 204 creates example segment ID stack 224 for an SP between ingress edge node 204 and egress edge node 222. Example segment stack 224 can be created for a particular FEC (e.g., FEC F). Example stack 224 includes three segment IDs: nodal segment IDs 66 and 72 advertised by nodes 208 and 222, respectively, and adjacency segment ID 9003 advertised by node 208. Stack 224 corresponds to an SP in which packets flow in order through nodes 204, 206, 208, 216, 218, and 222.

In response to receiving a packet from access node AE1, SR node 204 or a centralized control plane server (not shown) can select a segment ID stack based on information contained in the packet. For example, node 204 can calculate FEC F for a received packet P based on the destination IP address in packet P. FEC F is mapped to example segment ID stack 224 in a table not shown. Node 204 attaches segment ID stack 224 to packet P. Example segment ID stack 224 lists segment IDs that correspond to one-hop and multi-hop segments that packets traverse to reach egress edge node 222. The segments collectively form the SP corresponding to segment ID stack 224. Once the segment ID stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned nodal segment ID 66.

Figure 3:
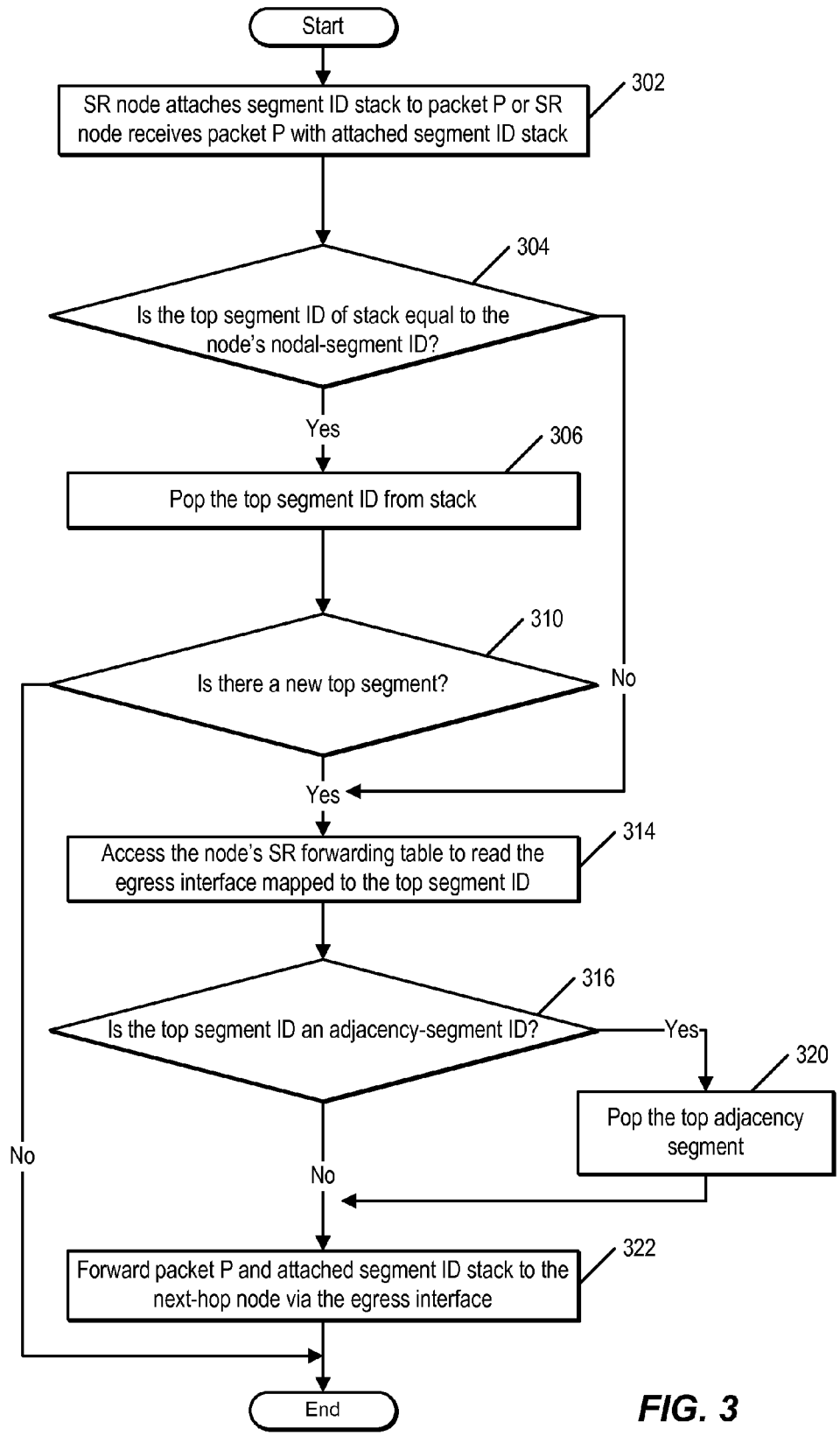
FIG. 3 is a flow chart illustrating an example process employed by a node of the network shown in FIG. 2.

With continuing reference to FIG. 2, FIG. 3 illustrates an example process of packet forwarding using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet, the SR node determines in step 304 whether the top segment ID of the segment ID stack matches the nodal segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the segment ID stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency segment ID. This determination can be implemented by comparing the top segment ID with the designated range of adjacency segment IDs that are available for assignment within the network. If the top segment ID is found to be within the designated range, the top segment ID is an adjacency segment ID and it is popped at 320. In step 322 the SR node forwards packet P and attached segment ID stack to the next node via the egress interface identified in step 314.

With continuing reference to FIG. 3, FIG. 2 shows packet P and attached segment ID stack 224 as it is forwarded by nodes. As shown, nodes 204 and 206 forward packet P and segment ID stack 224 without popping a segment ID. However, node 208 pops nodal segment ID 66 and adjacency segment ID 9003 in accordance with steps 306 and 320, respectively, before the packet P and segment ID stack 224 are forwarded to node 216 in accordance with step 322. Nodes 216 and 218 forward packet P and segment ID stack 224 without popping segment IDs. SR egress edge node 222 recognizes itself as the last hop of the SP. Eventually, node 222 may employ traditional IP routing and forward packet P to access node AE2 based on routing table lookup using the destination IP address within packet P.

Fast Reroute

Nodes are often considered the fundamental elements of networks. As discussed above, nodes can be connected with each other by links to form a network topology. The nodes in a given network can exchange information about the network topology with each other such that each node in the network agrees upon the network topolgy. Links and nodes sometimes fail. Such failures represent modifications of the network topology. It takes time for the remaining nodes in the network to converge on the modified topology. Typically such convergence involves communicating with other nodes in the network. During this period of convergence, traffic in the network can be disrupted. Disruptions can include, for example, delaying packets or even preventing packets from reaching intended destinations.

Fast reroute methods can be employed to reduce traffic delays, for example, traffic delays caused by link and node failures. Fast reroute typically involves a node computing alternative routes (backup paths) for traffic to follow in the event of a failure. Nodes can compute the backup paths in advance. If a node has a pre-computed backup path and, for example, a link fails, the node can forward traffic via the pre-computed backup path. Consider an example in which a node has decided to forward a packet destined for a certain destination across a specific link. If the specific link fails, the node, upon detecting the failure, can instead forward the packet along a pre-computed backup path to ensure that the packet still reaches the certain destination, but without traversing the failed specific link. As can be seen, one advantage of fast reroute is that fast reroute allows the node to forward packets on towards their destinations without needing to wait for the network to converge on a new topology. This often represents a reduction in delay by one or more orders of magnitude (e.g., from hundreds of milliseconds to tens of milliseconds).

Fast reroute can be employed in a variety of networks, including IP, MPLS, SR, and the like. There are various types of fast reroute, such as loop-free alternate (LFA), remote LFA (RLFA), and remote LFA with directed forwarding (DLFA). Generation of backup paths may be different for different network types and fast reroute types. Different network types may impose different constraints that affect the generation of backup paths, or utilize different procedures to generate the backup paths.

Fast Reroute with SR Traffic

Figure 4:
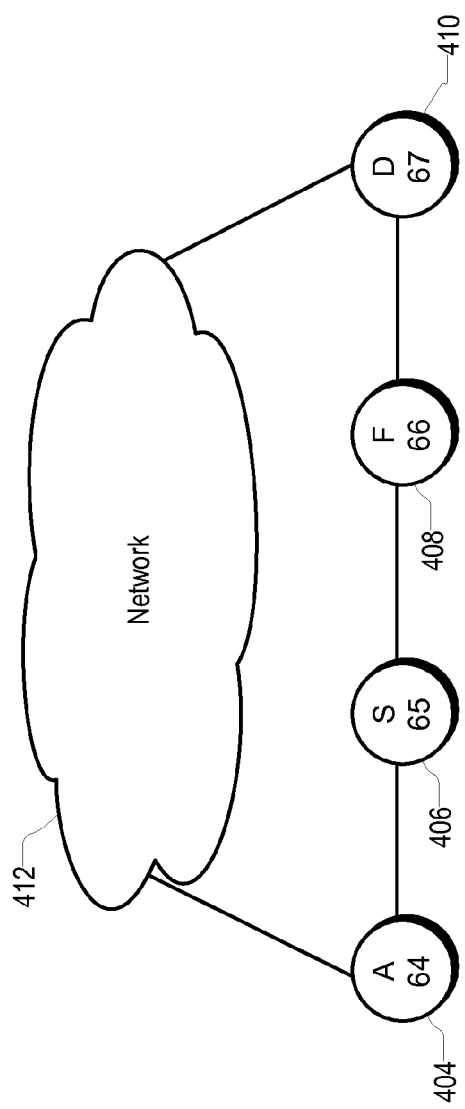
FIG. 4 is a block diagram illustrating an example network.

FIG. 4 shows an example diagram including components of a network. In one embodiment, the nodes are SR nodes. Network 400 consists of SR nodes 404-410. Nodes 404-410 are assigned unique nodal segment IDs 64-67. Each of the nodes 404-410 is assigned a unique loopback, e.g., loopbacks A, S, F, and D, respectively. These loopbacks are unique in the network and can be used for several purposes such as calculating the topology of network 400, which in turn can be used to create SPs and/or to identify SPTs and thus next hop egress interfaces for SR forwarding tables. Nodes 404-410 can also assign locally significant adjacency segment IDs. For example, node 406 can assign adjacency segment IDs 9001-9002 to links SF, and SA, respectively. Network 400 also includes network 412, which contains additional nodes and links including, for example, node R (not shown). The network components in network 412 can be used to provide backup paths in the event that a condition, such as a link failure, is detected with regard to nodes 404-410, or the links connecting nodes 404-410.

Figure 5:
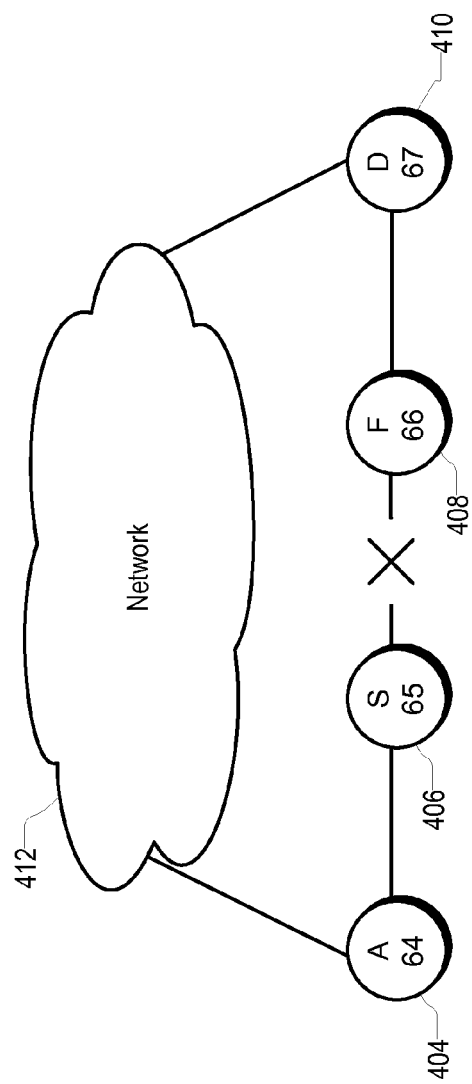
FIG. 5 is a block diagram illustrating an example network.

FIG. 5 shows an example diagram including components of a network. FIG. 5 shows many of the same elements as FIG. 4, and like elements are depicted by like figure numbers. In FIG. 5, the link between node S and node F has failed. In one embodiment, node S detects the failed link. If node S receives a packet destined for node F, as indicated by a segment ID in the packet's segment ID stack, node S can decide to reroute the packet using a pre-computed backup path.

Using fast reroute terminology, a protected segment is a segment whose destination is reached (or made reachable) using a backup path. In the example of FIG. 5, packets whose segment ID stack includes an identifier for adjacency segment SF cannot be forwarded along adjacency segment SF, due to the link failure between node S and node F. If node S reroutes traffic using a backup path such that the traffic intended to traverse adjacency segment SF reaches node F without having to traverse the link between node S and node F, adjacency segment SF is said to have been protected. In this example, node S is said to be the protecting node.

Rerouting a packet whose segment ID stack includes an identifier for adjacency segment SF involves node S modifying the segment ID stack encoded in the packet's header. Techniques used to implement fast reroute with SR packets vary depending on the types of segments included in a packet's segment stack. That is, the modifications performed by the protecting node to the segment ID stack depend on the type of segment being protected. In some cases the modifications also depend on the types of other segments in the segment ID stack. For example, the protecting node may perform different procedures if the protected segment is a nodal segment than the protecting node would perform if the protected segment were an adjacency segment.

Figure 6A:
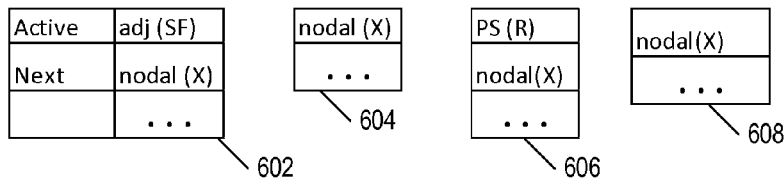
FIGS. 6A through 6E are graphical representations of segment ID stacks.

FIGS. 6A through 6E illustrate examples of segment ID stacks and modifications made to the segment ID stacks. The changes differ depending on the types of segments being protected. FIG. 6A shows the case where an adjacency segment is being protected and the next segment in the segment ID stack is a nodal segment. Starting at 602, FIG. 6A shows, sequentially, modifications made to a segment ID stack. In one embodiment, the modifications are made in response to detecting a reroute condition. For the purposes of this disclosure, when reference is made to popping a segment ID, it is understood that the segment ID may not be physically removed from the segment ID stack, but instead, a pointer to the segment ID stack can be incremented or advanced to the next segment ID in the segment ID stack. When reference is made to pushing a segment ID onto the top of the stack, it is understood that the segment ID (e.g., protection list) can be pushed onto the segment ID stack in the location indicated by the pointer to the segment ID stack, which may or may not actually be the top of the segment ID stack, as noted above.

602 illustrates a portion of a segment ID stack that can be included in an SR packet. The segment ID stack shown in 602 includes an active segment, located at the top of the segment ID stack. While the active segment is shown at the top of the segment ID stack in 602, in some embodiments, the active segment can be designated by an active segment pointer, and located in any other position of the segment ID stack than the top of the segment ID stack. The active segment indicates which segment a packet is currently traversing, or is about to traverse. Also shown in 602 is a next segment value. The next segment field of the segment ID stack indicates which segment a packet will follow once the packet reaches the destination node associated with the active segment. Similar to the active segment field, the next segment field can be a fixed position within the segment ID stack, e.g., the second position as shown in 602, or can be located in any other position in the segment ID stack and identified by other means, e.g., a pointer. As represented by the ellipsis depicted in 602, additional segment identifiers can be included in the segment ID stack, for example following the active segment and next segment identifiers.

Using FIG. 5 as an example, segment ID stack 602 is contained in the header of an SR packet that arrives at node S. As shown in 602, the active segment in the segment ID stack identifies the adjacency segment SF. Thus, the type of active segment is an adjacency segment. While 602 and subsequent elements of FIGS. 6A-6E use text to represent segments, e.g., "adj (SF)" to represent the adjacency segment SF, this is done for the purposes of readability. An actual segment ID stack would contain a locally significant identifier representing adjacency segment SF, such as 9005. The next segment in the segment ID stack 602 is nodal segment X. Thus the type of the next segment is nodal segment. Nodal segment X represents a nodal segment ending at node X (not shown). As with the adjacency segment, the text "nodal (X)" is substituted in this disclosure for an actual segment identifier to enhance readability. An actual segment ID stack would contain a unique identifier for a nodal segment ID, e.g., 64.

Since adjacency segment SF cannot be traversed, e.g., due to the failure of the link between node S and node F, node S initiates a fast reroute procedure after detecting the failure. As part of the fast reroute procedure (or update routine), node S pops (removes) the adjacency segment ID "adj (SF)" off of the segment ID stack. 604 shows the segment ID stack after the segment ID for adjacency segment SF has been popped off the segment ID stack.

In order to reroute the packet, node S pushes a protection list onto the segment ID stack. 606 shows the segment ID stack after the protection list "PS (R)" has been pushed onto the segment ID stack. The protection list PS (R) represents a list of one or more segment identifiers which form a backup path that, when followed by a packet, causes the packet to be rerouted to a node R (not shown). Protection list PS (R) can include, for example, one or more adjacency segment identifiers and/or nodal segment identifiers. Node R is located, for example, in network 412 of FIG. 5. Packets traversing the segments associated with protection list PS (R) will arrive at node R. From node R, the packets can be routed using the shortest path to node X. When the packet leaves node S, the segment ID stack appears as shown at 606. At 608, the segment ID stack that is included in the packet when the packet reaches node X, is shown. As can be seen, the one or more segments included in the protection list PS (R) have been popped from the segment ID stack as the packet traversed the backup path.

Figure 6B:
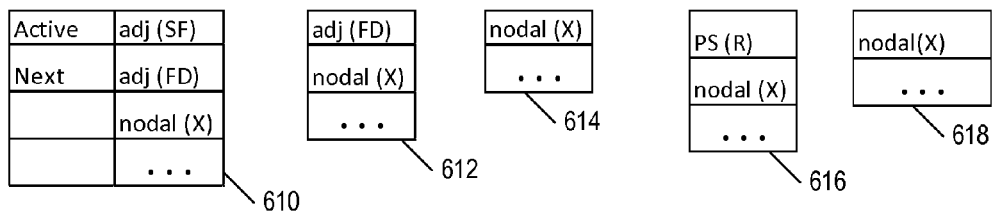
Figure 8:
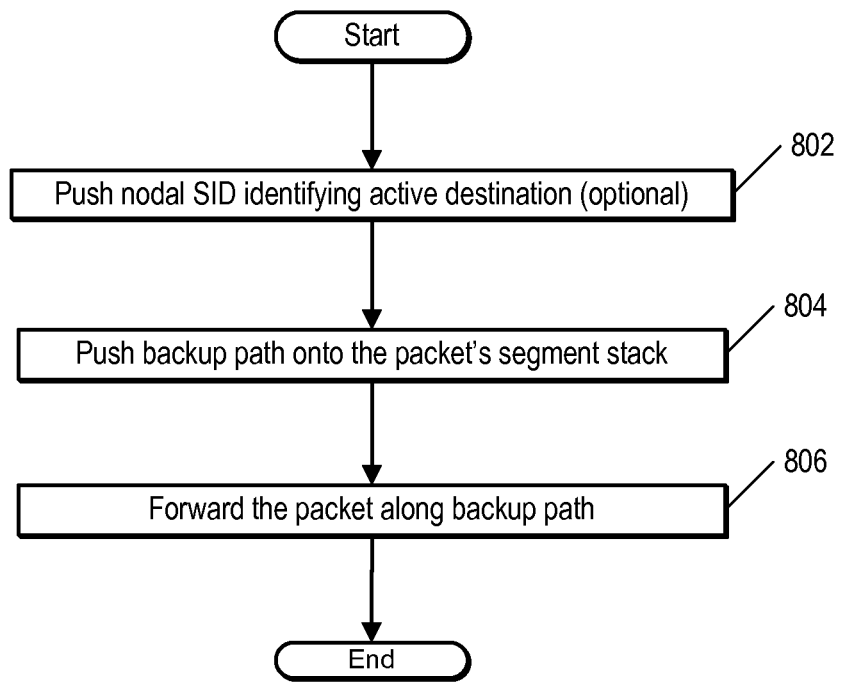
FIG. 8 is a flow chart illustrating an example process employed by a node.

FIG. 6B shows, sequentially, modifications made to a segment ID stack in an SR packet's header where the active segment in the segment ID stack is an adjacency segment SF, the next segment identifier in the segment ID stack is an adjacency segment FD, and the adjacency segment identifiers in the segment ID stack are followed by a nodal segment identifier representing nodal segment X. The routine shown in 6B is similar to that of 6A where an adjacency segment is followed by a nodal segment. However, one difference is that the active adjacency segment ID and the subsequent nodal segment ID are separated by one or more intervening adjacency segments IDs. In this example, the intervening adjacency segment IDs are removed (e.g., by node S in response to detecting a failure in the link between node S and node F) from the segment ID stack. This is permissible at least because the intervening adjacency segments need not be traversed in order for a packet that has been rerouted to node R to be able to arrive at node X along nodal segment X without traversing the failed link between node F and node S. Additional details regarding this example are shown in FIG. 8.

While FIG. 6B illustrates one intervening adjacency segment (adj (FD)) any number of intervening adjacency segments may be present. If additional intervening adjacency segment identifiers are included in the segment ID stack, the additional intervening adjacency segment identifiers will be popped from the segment ID stack until, as shown at 614, the subsequent nodal segment ID is in the active segment position of the segment ID stack (e.g., on top of the segment ID stack). After the adjacency segment IDs have been popped, the node pushes a protection list (e.g., protection list PS (R)) onto the segment ID stack, as shown at 616. When the packet leaves node S, the segment ID stack appears as shown at 616. At 618, the segment ID stack that is included in the packet when the packet reaches node X, is shown. As can be seen, the one or more segments included in protection list PS (R) have been popped from the segment ID stack by, for example, node R and any other segment destination nodes between node S and node R that the packet traverses in reaching node R.

Figure 6C:
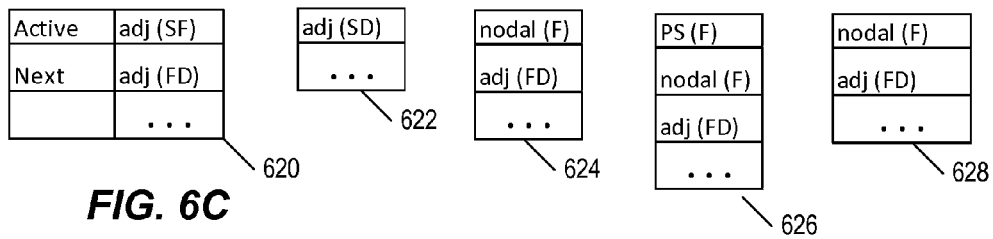

FIG. 6C shows, sequentially, modifications made to a segment ID stack that includes an adjacency segment identifier representing the adjacency segment SF as the active segment where the next segment in the segment ID stack is an identifier for another adjacency segment, e.g., adjacency segment FD. This segment ID stack is shown, at 620, in the format in which the segment ID stack reaches node S.

As shown at 622, the segment ID stack reflects that the active adjacency segment identifier for adjacency segment SF has been removed or popped from the stack. At 624, a nodal segment identifier representing a nodal segment F is pushed (added) onto the stack. This ensures that a packet being rerouted, e.g., due to a failure on the link between node S and node F will return to node F. At 626, the segment ID stack reflects that the protection list PS (F) has been pushed onto the stack. The packet is forwarded from node S along the one or more segments included in the protection list PS (F). Upon completion of the traversal of the segments included in protection list PS (F), the packet arrives at node F. 628 shows the segment ID stack included in the packet's header when the packet arrives at node F. Identifiers representing the one or more segments included in protection list PS (F) have been popped as the packet traversed the one or more segments included in PS (F).

Figure 6D:
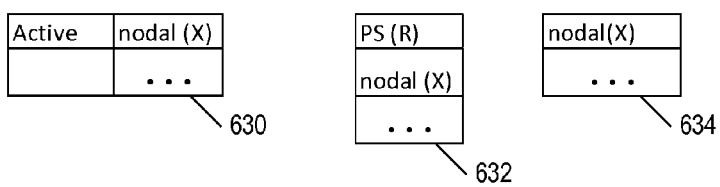

FIG. 6D shows, sequentially, modifications made to a segment ID stack in an SR packet's header in an example where the protected segment is a nodal segment. The segment ID stack when it reaches node S is shown at 630 and includes nodal segment X as the active segment. In the example of FIG. 6D, the operations performed by node S are the same whether the next segment is a nodal segment, adjacency segment, or any other segment type. 632 shows the segment ID stack after protection list PS (R) has been pushed onto the segment ID stack. 634 shows the segment ID stack when the packet arrives at node X from node R along nodal segment X.

Figure 6E:
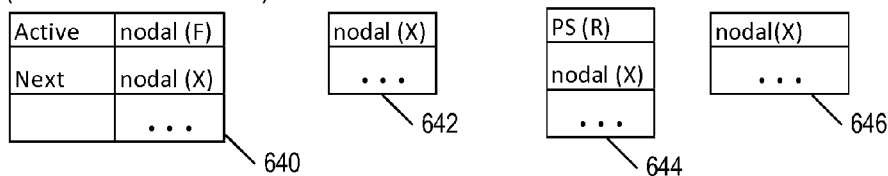

FIG. 6E shows, sequentially, modifications made to a segment ID stack in an SR packet's header in an example where the protected segment is a nodal segment and the protected segment is followed by another nodal segment. As shown at 640, the segment ID stack included in the SR packet includes an active segment identifier for nodal segment F followed by a next segment identifier for nodal segment X. When an active nodal segment is followed by a subsequent nodal segment the top nodal segment can be popped, as shown at 642. The single nodal segment ID for nodal segment X is sufficient to indicate a shortest path to node X. At 644, the segment ID stack is modified by pushing a protection list to node R onto the segment ID stack. At 646, when the packet arrives at node X, its segment ID stack includes a segment identifier for node X, the segment identifiers associated with PS (R) having been popped by node R and/or any intervening nodes between node S and node R.

Figure 7:
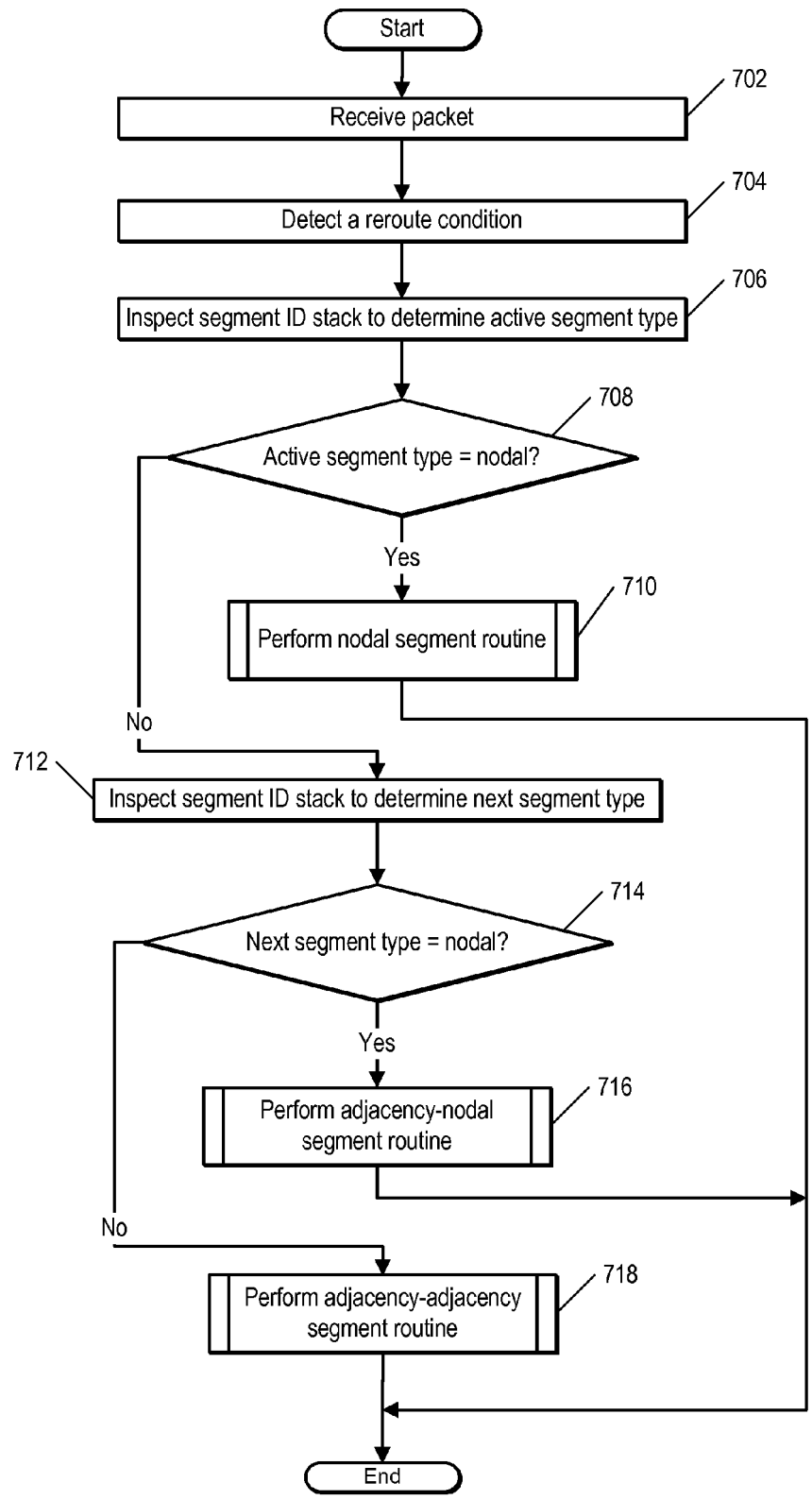
FIG. 7 is a flow chart illustrating an example process employed by a node.

FIG. 7 shows a method that can be performed by a node, such as node S of FIG. 5, in response to detecting a condition that indicates that a received packet should be rerouted. Such a reroute condition can include, for example, a failure on a link, a node failure, or any other condition which makes forwarding a packet along a specified path undesirable. Such factors may include link or node congestion, quality of service agreements, traffic engineering policies, political concerns, and the like. In response to detecting the reroute condition, the node reroutes the packet using fast reroute. Depending on the segment identifiers in the segment ID stack, the node selects one of several available update routines to implement the fast reroute operation.

At 702, the node receives a packet. In one embodiment, the packet is an SR packet having a segment ID stack and an SR header. At 704, the node detects a reroute condition. For example, the node can receive a message from another node indicating that a reroute condition exists, or the node can detect that an expected message, e.g., a confirmation message, was not received in a specified interval. In response to detecting the reroute condition, the node can modify the segment ID stack such that the packet is forwarded along a backup path to reach its original destination without traversing the undesirable element, e.g., failed link.

The node inspects, at 706, the segment ID stack to determine the active segment type. The active segment ID type can be, for example, a nodal segment, an adjacency segment, an area segment, or a service segment. Any other SR segment type can be included. In one embodiment, the node compares the active segment ID with a range of segment IDs known to be associated with a given segment type. For example, of nodal segment IDs are known to be within the range 64 and 5000, if a segment ID is within that range, the node determines that the segment associated with the segment ID is a nodal segment. In one embodiment, the node accesses a table that indicates, for a given segment ID, what type of segment is associated with the given segment ID.

At 708, the node determines whether the detected active segment type indicates that the active segment type is a nodal segment. In response to detecting that the type of segment listed as the active segment is a nodal segment, the node performs a nodal segment update routine at 710, as discussed in greater detail with respective to FIG. 8. The update routine shown in FIG. 8 includes operations appropriate to reroute a packet whose active segment is a nodal segment.

If the active segment is not a nodal segment type, e.g., the active segment is an adjacency segment, the method proceeds to 712. At 712, the node inspects the segment ID stack to determine the segment type associated with the next segment in the segment ID stack. In one embodiment, the node compares the next segment ID with a range of segment IDs known to be associated with a given segment type. For example, of nodal segment IDs are known to be within the range 64 and 5000, if a segment ID is within that range, the node determines that the segment associated with the segment ID is a nodal segment. In one embodiment, the node accesses a table that indicates, for a given segment ID, what type of segment is associated with the given segment ID.

At 714, the node determines whether the type of segment associated with the next segment in the segment ID stack is a nodal segment. In response to detecting, at 716, that the type of segment identified as the next segment is an adjacency segment, the node performs an adjacency-nodal update routine, as discussed in greater detail with respect to FIG. 9. The update routine shown in FIG. 9 includes operations appropriate to reroute a packet that has an adjacency segment as its active segment and a nodal segment as its next segment.

Figure 10:
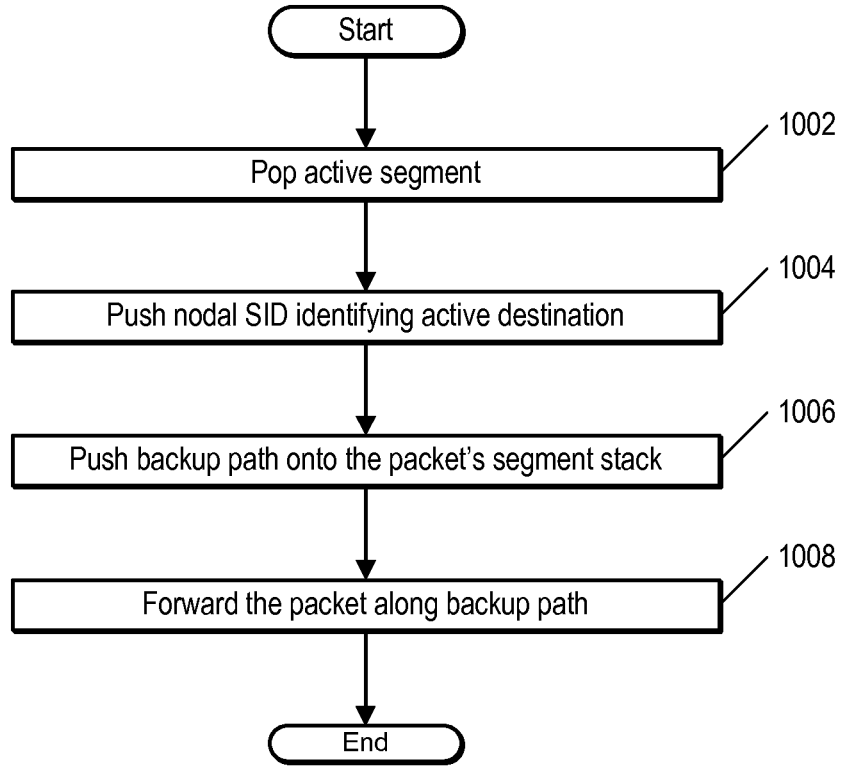
FIG. 10 is a flow chart illustrating an example process employed by a node.

If the node determines at 714 that the next segment type is not nodal, e.g., the next segment type is adjacency, the node performs an adjacency-adjacency update routine at 718, as discussed in greater detail with respect to FIG. 10. The update routine shown in FIG. 10 includes operations appropriate to reroute a packet that has an adjacency segment as its active segment and a nodal segment as its next segment.

FIG. 8 shows additional details concerning updating a segment ID stack by adding a backup path in the appropriate position of the segment ID stack. The update routine depicted in FIG. 8 is performed in response to detecting that a nodal segment is being protected, e.g., as shown at 710 of FIG. 7. In one embodiment, a node, such as node S of FIG. 5, performs the operations shown in FIG. 8.

At 802, the node pushes a nodal segment identifier, identifying a destination of the active segment, onto to the segment ID stack. This step is optionally performed. This behavior can be configured, e.g., by an operator or administrator of the network. If the operator wants to ensure that packets traverse the node the packets were originally destined for, 802 is performed. In one embodiment, the node for which the packet was originally destined performs a service, such as deep packet inspection, and it is important that the packet actually traverse the node. In this case, the nodal segment identifying the node is pushed at 802 onto the segment ID stack. In other embodiments, the packet does not need to traverse the node originally specified as the endpoint of the active nodal segment, and 802 is skipped.

At 804, the node pushes a backup path onto the packet's segment ID stack. The backup path comprises one or more segment identifiers. A packet traversing the backup path will eventually arrive at a node from which the packet can be forwarded to its next destination without traversing the node or link which triggered the reroute operation, e.g., as detected by the node at 704 of FIG. 7. At 806, the node forwards the packet along the backup path. In one embodiment, this involves looking up an egress interface associated with the active nodal segment (which is one of the segment associated with the protection list) and sending the packet to the egress interface.

Figure 9:
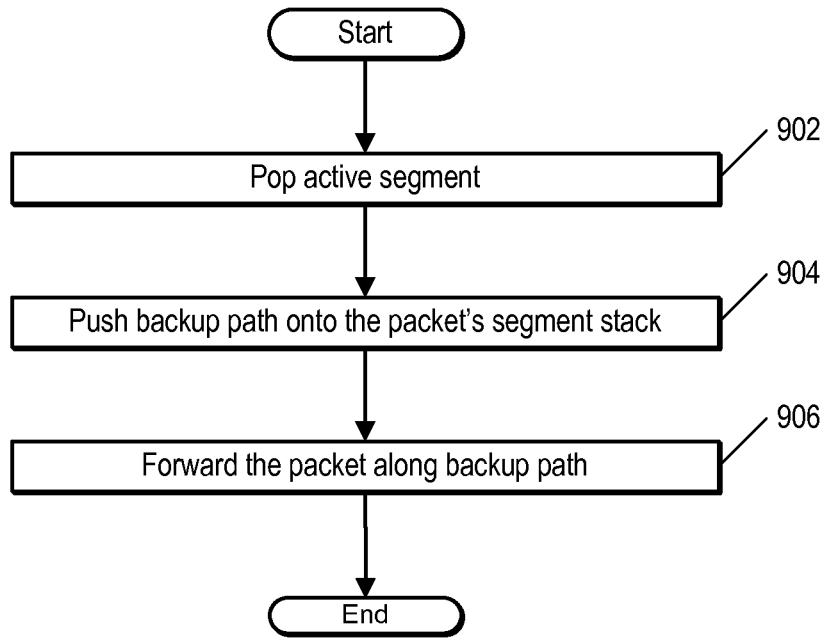
FIG. 9 is a flow chart illustrating an example process employed by a node.

FIG. 9 shows additional details concerning updating a segment ID stack by adding a backup path in the appropriate position of the segment ID stack. The update routine depicted in FIG. 9 is performed in response to detecting that an adjacency segment is being protected, where the segment ID stack includes a nodal segment immediately subsequent to the adjacency segment being protected, e.g., as shown at 716 of FIG. 7. In one embodiment a node, such as node S of FIG. 5, performs the operations shown in FIG. 9.

At 902, the node pops the active segment identifier from the top of the segment ID stack. At 904, the node pushes a backup path onto the packet's segment ID stack. The backup path comprises one or more segment identifiers. A packet traversing the backup path will eventually arrive at a node from which the packet can be forwarded to its next destination without traversing the node or link which triggered the reroute operation, e.g., as detected by the node at 704 of FIG. 7. At 906, the node forwards the packet along the backup path. In one embodiment, this involves looking up an egress interface associated with the active nodal segment (which is one of the segment associated with the protection list) and sending the packet to the egress interface.

FIG. 10 shows additional details concerning updating a segment ID stack by adding a backup path in the appropriate position of the segment ID stack. The update routine depicted in FIG. 10 is performed in response to detecting that an adjacency segment is being protected, where the segment ID stack includes another adjacency segment ID immediately subsequent to the adjacency segment being protected. e.g., as shown at 718 of FIG. 7. In one embodiment a node, such as node S of FIG. 5, performs the operations shown in FIG. 10.

At 1002, the node pops the active segment off the top of the segment ID stack. At 1004, the node pushes a nodal segment ID identifying the active destination. That is, the nodal segment identifier identifies a segment that ends at the node which was previously destination of the protected adjacency segment. This operation ensures that the packet will eventually reach the intended node, e.g., the destination of the adjacency segment that was originally the active segment in the segment ID stack (the protected segment).

At 1006, the node pushes a backup path onto the packet's segment ID stack. The backup path comprises one or more segment identifiers. A packet traversing the backup path will eventually arrive at a node from which the packet can be forwarded to its next destination without traversing the node or link which triggered the reroute operation, e.g., as detected by the node at 704 of FIG. 7. At 1008, the node forwards the packet on the backup path. In one embodiment, this involves looking up an egress interface associated with the active nodal segment (which is one of the segment associated with the protection list) and sending the packet to the egress interface.

Figure 11:
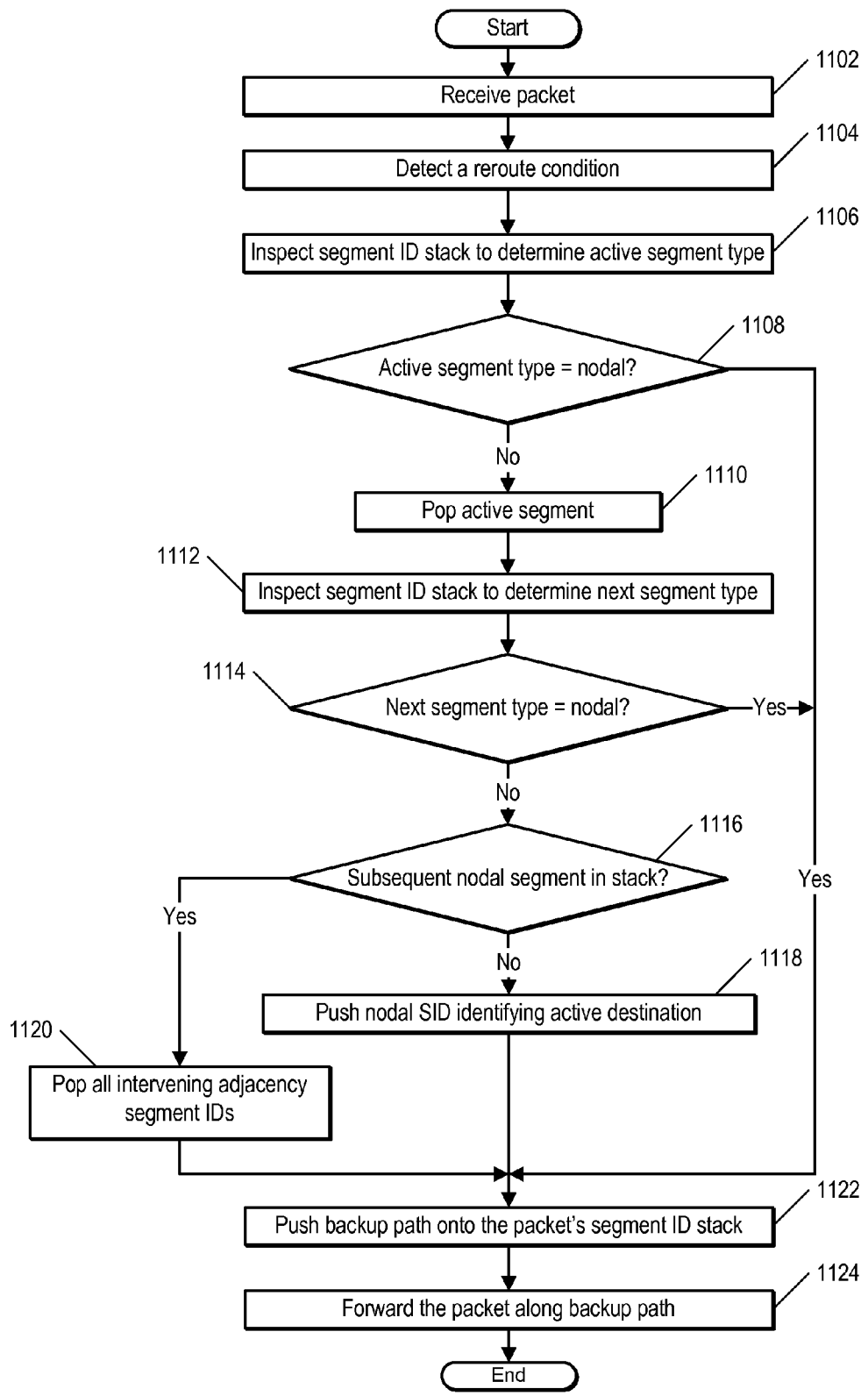
FIG. 11 is a flow chart illustrating an example process employed by a node.

FIG. 11 shows an alternative method of protecting an adjacency segment where the active segment in the segment ID stack is an adjacency segment followed by a subsequent nodal segment identifier in the segment ID stack. One difference between FIG. 11 and the methods described with regard to FIG. 7 and FIG. 9 (where an adjacency segment is immediately followed by a nodal segment) is that in the embodiment illustrated in FIG. 11, there may be any number of intervening adjacency segment IDs between the active adjacency segment ID and the subsequent nodal segment ID. That is that segment ID stack may contain identifiers for two or more adjacency segments followed by an identifier for a nodal segment, as is illustrated in FIG. 6B. In one embodiment a node, such as node S of FIG. 5, performs the operations shown in FIG. 11.

At 1102, the node receives a packet. In one embodiment, the packet is an SR packet having a segment ID stack and an SR header. At 1104, the node detects a reroute condition, such as link failure, node failure or other condition which makes forwarding traffic along the path specified by the segment ID stack undesirable or impossible. At 1106, the node inspects the segment ID stack contained in the packet to determine the type of segment identified as the active segment in the segment ID stack.

At 1108, the node determines whether the detected active segment type indicates that the active segment type is a nodal segment. If so, the method proceeds to 1122, where the node pushes a backup path onto the packet's segment ID stack. At 1124, the node forwards the packet along the backup path.

If the active segment type is not a nodal segment, for example, if the active segment type is an adjacency segment, at 1110, the node pops the active segment identifier from the segment ID stack. At 1112, the node once again inspects the segment ID stack, this time to determine the type of segment identified as the next segment in the segment ID stack. If the next segment is a nodal segment, the method proceeds to 1122 and the method proceeds as discussed above.

Otherwise, for example, if the next segment type is an adjacency segment, the method proceeds to 1116. At 1116, the node determines whether the segment ID stack contains an identifier for a nodal segment. In one embodiment, this involves inspecting each segment identifier in the segment ID stack in turn to ascertain the segment type associated with each respective segment identifier until either the last segment in the segment ID stack is inspected or a nodal segment is identified. If a nodal segment is identified, the method proceeds to 1120, and the node pops all intervening adjacency segment IDs from the segment ID stack. This leaves the subsequent nodal segment ID as the active, e.g., top, segment in the segment ID stack. Otherwise, if there are no subsequent nodal segment IDs in the segment ID stack, at 1118 the node pushes the nodal segment ID identifier identifying the destination associated with the previous active segment onto the segment ID stack, and the method proceeds to 1122, where the node pushes a backup path onto the packet's segment ID stack, and 1124, where the node forwards the packet along the backup path.

Figure 12:
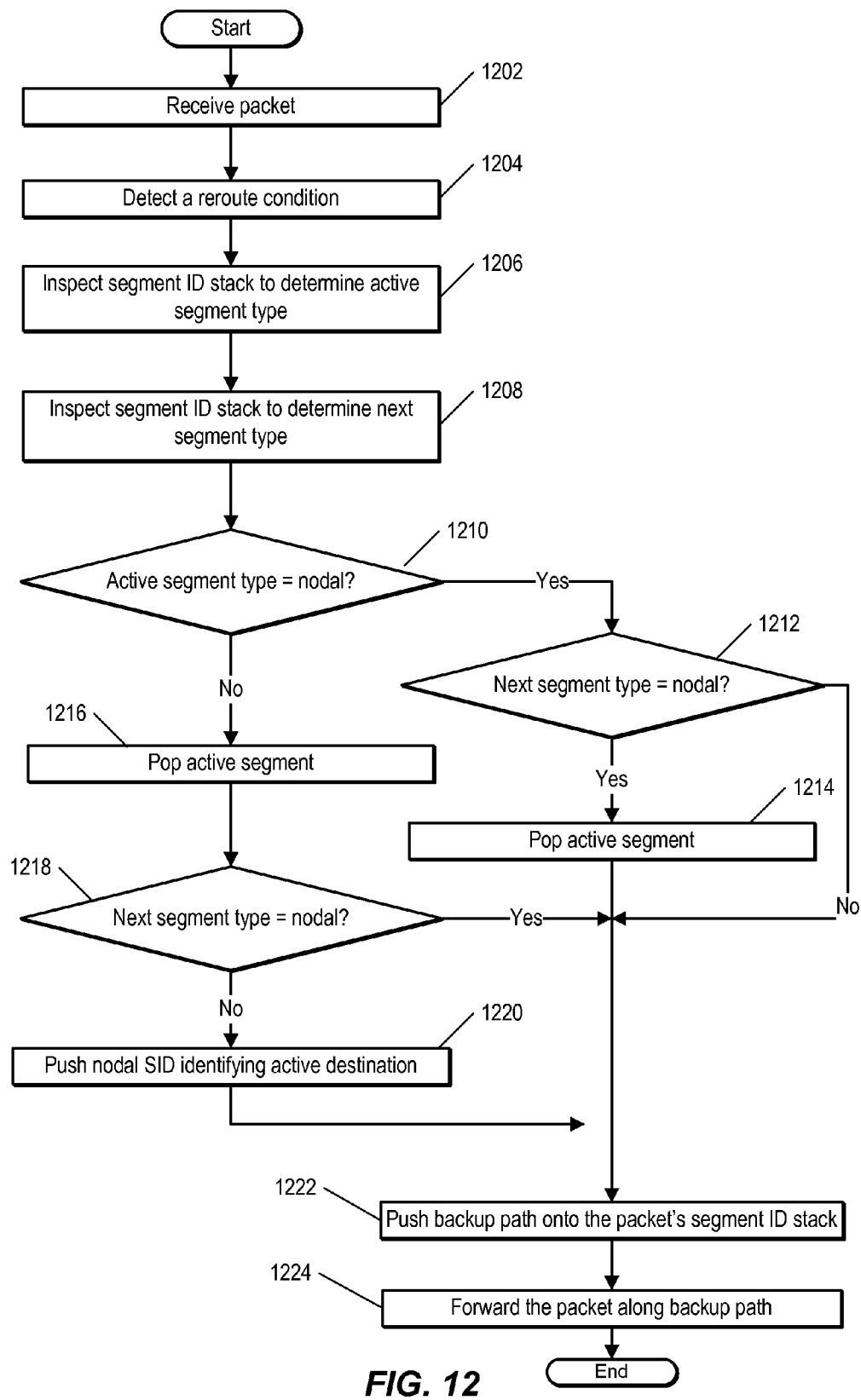
FIG. 12 is a flow chart illustrating an example process employed by a node.

FIG. 12 shows an alternative method of protecting a nodal segment, where the segment ID stack includes subsequent nodal segment identifier, as shown in FIG. 6E. One difference between this and the methods described with regard to FIG. 7 and FIG. 8 is that in this embodiment, the node determines the segment identifier type that follows a nodal segment in the segment ID stack, whereas this determination is excluded in FIG. 7 and FIG. 8. In one embodiment a node, such as node S of FIG. 5, performs the operations shown in FIG. 12.

At 1202, the node receives a packet. In one embodiment, the packet is an SR packet having a segment ID stack and an SR header. At 1204, the node detects a reroute condition, such as link failure, node failure or other condition which makes forwarding traffic along the path specified by the segment ID stack undesirable or impossible. The node inspects, at 1206, the segment ID stack contained in the packet to determine the type of segment identified as the active segment in the segment ID stack. At 1208, the node inspects the segment ID stack to determine the type of segment identified as the next segment in the segment ID stack.

At 1210, the node determines whether the detected active segment type is a nodal segment. If not, for example, if an active segment type is an adjacency segment, the node pops the active segment identifier from the segment identifier stack at 1216. At 1218, the node determines whether the detected next segment type is a nodal segment. If not, e.g., if the active segment type is adjacency and the next segment type is also adjacency, the node pushes the nodal segment identifier identifying the destination associated with the previous active segment onto the segment ID stack at 1220. This ensures that a rerouted packet will be forwarded to the destination of the original active segment.

If, at 1210, the node determines that the active segment type was a nodal segment, the node then determines, at 1212 whether the next segment type is also nodal segment. If not, the method proceeds to 1222, where the node pushes a backup path onto the packet's segment ID stack. At 1224, the node forwards the packet along the backup path. If both the active segment type and the next segment type are nodal segments, at 1214, the node pops the active segment identifier from the segment ID stack.

Example Node

Figure 13:
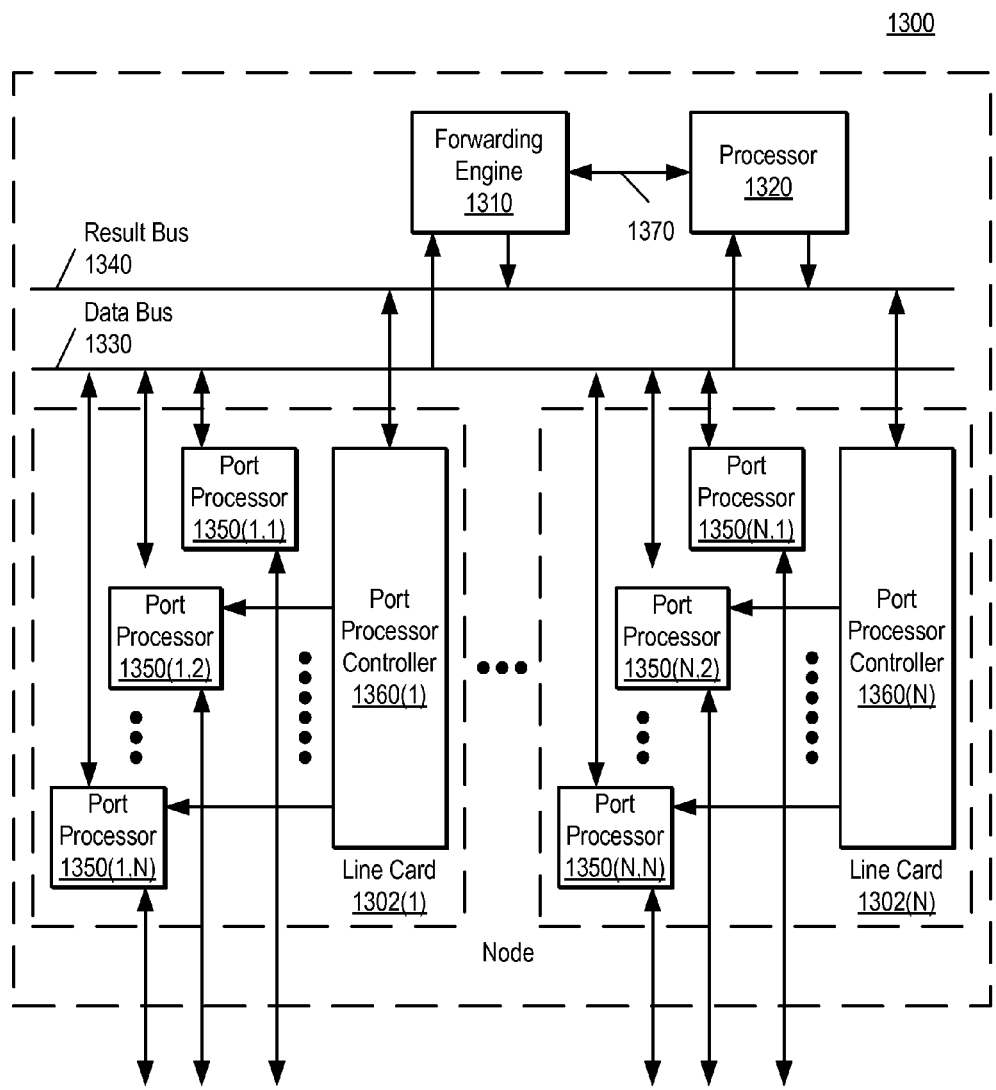
FIG. 13 is a block diagram illustrating certain components of an example node that can be employed in the network of FIG. 1, 2, 4, or 5.

FIG. 13 is a block diagram illustrating certain additional and/or alternative components of nodes that can be employed in the network shown in FIGS. 1, 2, 4, and 5. In this depiction, node 1300 includes a number of line cards (line cards 1302(1)-(N)) that are communicatively coupled to a forwarding engine or packet forwarder 1310 and a processor 1320 via a data bus 1330 and a result bus 1340. Line cards 1302(1)-(N) include a number of port processors 1350(1,1)-(N,N) which are controlled by port processor controllers 1360(1)-(N). It will also be noted that forwarding engine 1310 and processor 1320 are not only coupled to one another via data bus 1330 and result bus 1340, but are also communicatively coupled to one another by a communications link 1370.

The processors 1350 and 1360 of each line card 1302 may be mounted on a single printed circuit board. When a packet or packet and header are received, the packet or packet and header may be identified and analyzed by router 1300 in the following manner. Upon receipt, a packet (or some or all of its control information) or packet and header is sent from the one of port processors 1350(1,1)-(N,N) at which the packet or packet and header was received to one or more of those devices coupled to data bus 1330 (e.g., others of port processors 1350(1,1)-(N,N), forwarding engine 1310 and/or processor 1320). Handling of the packet or packet and header can be determined, for example, by forwarding engine 1310. For example, forwarding engine 1310 may determine that the packet or packet and header should be forwarded to one or more of port processors 1350(1,1)-(N, N). This can be accomplished by indicating to corresponding one(s) of port processor controllers 1360(1)-(N) that the copy of the packet or packet and header held in the given one(s) of port processors 1350(1,1)-(N,N) should be forwarded to the appropriate one of port processors 1350(1,1)-(N,N). In addition, or alternatively, once a packet or packet and header has been identified for processing, forwarding engine 1310, processor 1320 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Node 1300 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to node 1300 for storage in memory via a network such as the Internet or upon a carrier medium.

The computer-readable medium containing the computer program may be loaded into node 1300. All or a portion of the computer program stored on the computer-readable medium may then be stored in system memory and/or various portions of storage devices coupled to node 1300 (not shown). When executed by processor 1320, a computer program loaded into node 1300 may cause processor 1320 to perform and/or be a means for performing the functions of one or more of the embodiments described and/or illustrated herein. Additionally or alternatively, one or more of the embodiments described and/or illustrated herein may be implemented in firmware and/or hardware.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a packet, wherein
      the packet comprises a segment routing (SR) segment identifier (ID) stack;
   determining an active segment type of a plurality of segment types, wherein
      the active segment type is associated with an active segment in the SR segment ID stack, and
      the active segment type is one of nodal segment or adjacency segment;
   selecting an update routine based, at least in part, on the active segment type; and
   performing the update routine, wherein
      the performing the update routine comprises modifying the SR segment ID stack.

2. The method of claim 1, further comprising:
   detecting a reroute condition, wherein
      the determining is performed in response to the detecting; and
   forwarding a packet along a backup path specified by the SR segment ID stack.

3. The method of claim 1, further comprising:
   determining a next segment type associated with a next segment in the SR segment ID stack.

4. The method of claim 3, further comprising:
   determining a position within the SR segment ID stack, wherein the position is based on the active segment type and the next segment type; and pushing a protection list onto the SR segment ID stack at the position.

5. The method of claim 1, wherein the modifying comprises:
pushing at least one segment identifier onto the SR segment ID stack.

6. The method of claim 5, wherein
the at least one segment identifier comprises a protection list.

7. The method of claim 1, wherein the modifying comprises:
popping at least one segment identifier off of the SR segment ID stack.

8. The method of claim 1, further comprising:
detecting that the SR segment ID stack comprises a plurality of adjacency segment identifiers followed by a nodal segment identifier; and
in response to the detecting, popping each of the adjacency segment identifiers of the plurality of adjacency segment identifiers off of the SR segment ID stack.

9. The method of claim 3, further comprising:
detecting that the active segment type is nodal segment and the next segment type is nodal segment; and
in response to the detecting, popping the active segment identifier off of the SR segment ID stack.

10. A system comprising:
a first node configured to
receive a packet, wherein
the packet comprises a segment routing (SR) segment identifier (ID) stack;
determine an active segment type of a plurality of segment types, wherein
the active segment type is associated with an active segment in the SR segment ID stack, and
the active segment type is one of nodal segment or adjacency segment;
select an update routine based, at least in part, on the active segment type; and
perform the update routine, wherein
performing the update routine comprises modifying the SR segment ID stack.

11. The system of claim 10, wherein the first node is further configured to:
detect a reroute condition, wherein
determining the active segment type is performed in response to detecting the reroute condition; and
forward a packet along a backup path specified by the SR segment ID stack.

12. The system of claim 10, wherein the first node is further configured to:
determine a next segment type associated with a next segment in the SR segment ID stack.

13. The system of claim 12, wherein the first node is further configured to:
determine a position within the SR segment ID stack, wherein
the position is based on the active segment type and the next segment type; and
push a protection list onto the SR segment ID stack at the position.

14. The system of claim 12, wherein the first node is further configured to:
detect that the active segment type is nodal segment and the next segment type is nodal segment; and
in response to detecting the active segment type and the next segment type, pop the active segment identifier off of the SR segment ID stack.

15. The system of claim 10, wherein the first node is further configured to:
detect that the SR segment ID stack comprises a plurality of adjacency segment identifiers followed by a nodal segment identifier; and
pop each of the adjacency segment identifiers of the plurality of adjacency segment identifiers off of the SR segment ID stack.

16. A non-transitory computer readable medium comprising executable instructions, wherein a method is implemented in response to executing the instructions, the method comprising:
receiving a packet, wherein
the packet comprises a segment routing (SR) segment identifier (ID) stack;
determining an active segment type of a plurality of segment types, wherein
the active segment type is associated with an active segment in the SR segment ID stack, and
the active segment type is one of nodal segment or adjacency segment;
selecting an update routine based, at least in part, on the active segment type; and
performing the update routine, wherein
the performing the update routine comprises modifying the SR segment ID stack.

17. The non-transitory computer readable medium of claim 16 wherein the method further comprises:
detecting a reroute condition, wherein
the determining is performed in response to the detecting; and
forwarding a packet along a backup path specified by the SR segment ID stack.

18. The non-transitory computer readable medium of claim 16 wherein the method further comprises:
determining a next segment type associated with a next segment in the SR segment ID stack.

19. The non-transitory computer readable medium of claim 18 wherein the method further comprises:
determining a position within the SR segment ID stack, wherein
the position is based on the active segment type and the next segment type; and
pushing a protection list onto the SR segment ID stack at the position.

20. The non-transitory computer readable medium of claim 16 wherein the method further comprises:
detecting that the active segment type is nodal segment and the next segment type is nodal segment; and
in response to the detecting, popping the active segment identifier off of the SR segment ID stack.

* * * * *